United States Patent
Breyer et al.

(10) Patent No.: US 9,109,123 B2
(45) Date of Patent: Aug. 18, 2015

(54) UREA MIXTURES AND METHODS FOR MAKING AND USING SAME

(71) Applicant: Georgia-Pacific Chemicals LLC, Atlanta, GA (US)

(72) Inventors: Robert A. Breyer, Atlanta, GA (US); Nayiby Contreras, Norcross, GA (US); Jeffrey J. Otjen, Salem, OR (US); Melissa J. Cannon, Ellenwood, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 0 days.

(21) Appl. No.: 14/203,811

(22) Filed: Mar. 11, 2014

(65) Prior Publication Data

US 2014/0262019 A1   Sep. 18, 2014

Related U.S. Application Data

(60) Provisional application No. 61/783,409, filed on Mar. 14, 2013.

(51) Int. Cl.
| | |
|---|---|
| *C09D 7/12* | (2006.01) |
| *B27K 5/02* | (2006.01) |
| *C09D 15/00* | (2006.01) |
| *C08L 61/24* | (2006.01) |
| *C08G 12/12* | (2006.01) |
| *C08K 5/053* | (2006.01) |
| *C09D 161/24* | (2006.01) |
| *C08K 5/21* | (2006.01) |

(52) U.S. Cl.
CPC .............. *C09D 7/1233* (2013.01); *B27K 5/02* (2013.01); *C08G 12/12* (2013.01); *C08K 5/053* (2013.01); *C08K 5/21* (2013.01); *C08L 61/24* (2013.01); *C09D 15/00* (2013.01); *C09D 161/24* (2013.01)

(58) Field of Classification Search
CPC ............................... C09D 7/1233; C08L 61/24
See application file for complete search history.

(56) References Cited

U.S. PATENT DOCUMENTS

| | | | | |
|---|---|---|---|---|
| 1,799,954 | A * | 4/1931 | Cherry | 524/732 |
| 2,972,587 | A * | 2/1961 | Berry | 524/56 |
| 3,994,850 | A * | 11/1976 | Willegger et al. | 524/799 |
| 4,033,745 | A * | 7/1977 | Moore | 71/28 |
| 4,247,433 | A * | 1/1981 | Schamberg et al. | 524/843 |
| 4,273,883 | A * | 6/1981 | Korf | 521/113 |
| 4,280,830 | A * | 7/1981 | Ferguson et al. | 71/25 |
| 4,282,119 | A * | 8/1981 | Tinkelenberg et al. | 524/18 |
| 4,526,606 | A * | 7/1985 | Formaini | 504/101 |
| 4,530,713 | A * | 7/1985 | Williams | 71/28 |
| 5,635,583 | A * | 6/1997 | Motter et al. | 528/243 |
| 5,837,755 | A * | 11/1998 | Takiyama et al. | 524/18 |
| 8,741,430 | B2 * | 6/2014 | No et al. | 428/393 |
| 2005/0127550 | A1 * | 6/2005 | De Bruyn et al. | 264/109 |
| 2006/0057353 | A1 * | 3/2006 | Motter et al. | 428/297.4 |
| 2008/0041131 | A1 * | 2/2008 | Van Belzen et al. | 71/64.12 |
| 2008/0141747 | A1 * | 6/2008 | Phillips | 71/30 |
| 2009/0326166 | A1 * | 12/2009 | No et al. | 525/509 |
| 2009/0326185 | A1 * | 12/2009 | No et al. | 528/256 |
| 2012/0115994 | A1 * | 5/2012 | Breyer et al. | 524/14 |
| 2013/0327250 | A1 * | 12/2013 | Shooshtari | 106/217.5 |

* cited by examiner

*Primary Examiner* — Liam J Heincer
(74) *Attorney, Agent, or Firm* — Ram W. Sabnis

(57) ABSTRACT

Urea mixtures and methods for making and using same are provided. In at least one specific embodiment, the urea mixture can include urea, a urea-aldehyde resin, a liquid medium, and a sugar. The urea mixture can have an aldehyde to urea molar ratio of about 0.2:1 to about 0.7:1. The urea mixture can have a sugar concentration of about 2 wt % to about 8 wt %, based on the combined weight of the urea, the urea-aldehyde resin, the liquid medium, and the sugar.

20 Claims, No Drawings

UREA MIXTURES AND METHODS FOR MAKING AND USING SAME

CROSS-REFERENCE TO RELATED APPLICATION

This application claims priority to U.S. Provisional patent application having Ser. No. 61/783,409, filed Mar. 14, 2013, which is incorporated by reference herein.

BACKGROUND

1. Field

Embodiments described generally relate to urea mixtures. More particularly, such embodiments relate to urea mixtures that include urea, a urea-aldehyde resin, a liquid medium, and a sugar and methods for making and using same.

2. Description of the Related Art

Typical adhesives used in the production of lignocellulose composite products such as medium density fiberboard, plywood, and particle board include amino-formaldehyde resins such as urea-formaldehyde ("UF"), melamine-formaldehyde ("MF"), and melamine-urea-formaldehyde ("MUF") resins. While these resins produce lignocellulose composite products having desirable properties, such as strength, these resins can release formaldehyde into the environment during the production of the resin, during the curing of the resin, and during recycling or incineration of the composite product at the end of its lifecycle. The release of formaldehyde is undesirable due to its environmental and health effects.

Various techniques have been used to reduce the amount of formaldehyde released from amino-formaldehyde resins. One such technique is the addition of formaldehyde scavengers, e.g., urea, to the resins. Urea is typically used in solution form, but solutions with high concentrations of urea, e.g., 40% aqueous urea, are susceptible to having the urea precipitate out of solution. In the past, salts have been used to inhibit this precipitation. Salt, however, can have drawbacks such as causing corrosion and forming build-up in the processing equipment.

There is a need, therefore, for improved urea solutions that are stable for extended periods of time and can be used as formaldehyde scavengers.

SUMMARY

Urea mixtures and methods for making and using same are provided. In at least one specific embodiment, the urea mixture can include urea, a urea-aldehyde resin, a liquid medium, and a sugar. The urea mixture can have an aldehyde to urea molar ratio of about 0.2:1 to about 0.7:1. The urea mixture can have a sugar concentration of about 2 wt % to about 8 wt %, based on the combined weight of the urea, the urea-aldehyde resin, the liquid medium, and the sugar.

In at least one specific embodiment, the method for making a urea mixture can include reacting an aldehyde and urea at a molar ratio of about 1.6:1 to about 2.4:1 in the presence of a liquid medium to produce a urea-aldehyde resin. The method can also include adding urea to the urea-aldehyde resin to provide an intermediate mixture having an aldehyde to urea molar ratio of about 0.2:1 to about 0.7:1. The method can also include adding a sugar to the intermediate mixture to produce a urea mixture that can include about 2 wt % to about 8 wt % sugar, based on the combined weight of the urea, the urea-aldehyde resin, the liquid medium, and the sugar.

In at least one specific embodiment, the method for making a composite product, can include contacting a plurality of lignocellulosic substrates with a urea mixture that can include urea, a urea-aldehyde resin, a liquid medium, and a sugar. The urea mixture can have an aldehyde to urea molar ratio of about 0.2:1 to about 0.7:1. The urea mixture can have a sugar concentration of about 2 wt % to about 8 wt %, based on the combined weight of the urea, the urea-aldehyde resin, the liquid medium, and the sugar. The method can also include at least partially curing the urea mixture to produce a composite product.

In at least one specific embodiment, the method for reducing emissions of $NO_X$ can include contacting a combustion effluent with a urea mixture that can include urea, a urea-aldehyde resin, a liquid medium, and a sugar. The urea mixture can have an aldehyde to urea molar ratio of about 0.2:1 to about 0.7:1. The urea mixture can have a sugar concentration of about 2 wt % to about 8 wt %, based on the combined weight of the urea, the urea-aldehyde resin, the liquid medium, and the sugar.

DETAILED DESCRIPTION

It has been surprisingly and unexpectedly discovered that urea mixtures that include one or more urea-aldehyde resins, one or more sugars, urea, and one or more liquid media, e.g., water, can be stable at a high non-volatile solids content. Consequently, greater amounts of the urea can be shipped per given volume and stored for long periods of time until needed. The urea mixture can be used as a formaldehyde scavenger for composite lignocellulose products that contain formaldehyde-based resins. And the urea mixtures can be effectively employed has a selective non-catalytic reduction ("SNCR") reagent for reducing oxidized nitrogen species from combustion effluents.

The urea mixture can have a molar ratio of aldehyde to total urea, which includes urea reacted into the urea-aldehyde resin and free urea, from a low of about 0.12:1, about 0.3:1, or about 0.4:1, to a high of about 0.8:1, about 1:1, or about 1.6:1. For example, the urea mixture can have a molar ratio of aldehyde to urea, which includes urea reacted into the urea-aldehyde resin and free urea, of about 0.2:1 to about 0.7:1, about 0.2:1 to about 0.4:1, about 0.2:1 to about 0.25:1, about 0.25:1 to about 0.35:1, about 0.35:1 to about 0.4:1, about 0.37:1 to about 0.45:1, about 0.43:1 to about 0.5:1, about 0.5:1 to about 0.6:1, about 0.55:1 to about 0.7:1, about 0.7:1 to about 0.8:1, or about 1:1 to about 1.5:1. The free urea can be in dynamic equilibrium through reversible condensation reactions with the urea that has been reacted into the urea-aldehyde resin.

The urea mixture can have a molar ratio of total urea to aldehyde, which includes urea reacted into the urea-aldehyde resin and free urea, of at least 1.3:1, at least 1.5:1, at least 1.7:1, at least 2:1, at least 2.2:1, at least 2.4:1, at least 2.5:1, at least 3:1, at least 4:1, or at least 5:1. For example, the urea mixture can have a molar ratio of urea to aldehyde, from a low of about 0.6:1, about 1:1, or about 1.2:1, to a high of about 2.5:1, about 5:1, or about 8:1. In another example, urea mixture can have a molar ratio of urea to aldehyde of about 0.7:1 to about 1:1, about 1:1 to about 2:1, about 2:1 to about 3:1, about 3:1 to about 5:1, about 4:1 to about 6:1, or about 5:1 to about 8:1.

The urea mixture can have a urea-aldehyde resin concentration from a low of about 1 wt %, about 5 wt %, about 10 wt %, about 15 wt %, or about 20 wt %, to a high of about 40 wt %, about 50 wt %, or about 60 wt %, based on the combined weight of urea, the urea-aldehyde resin, the liquid medium, and the sugar. In another example, the urea mixture can have a urea-aldehyde resin concentration of about 1 wt % to about 5 wt %, about 5 wt % to about 20 wt %, about 20 wt % to about 40 wt %, about 30 wt % to about 40 wt %, about 38 wt % to about 48 wt %, about 35 wt % to about 60 wt %, about 47 wt % to about 57 wt %, or about 40 wt % to about 60 wt %, based on the combined weight of urea, the urea-aldehyde resin, the liquid medium, and the sugar. In another example, the urea mixture can have a urea-aldehyde resin concentration of about 15 wt % to about 35 wt %, about 30 wt % to about 45 wt %, about 29 wt % to about 45 wt %, or about 46 wt % to about 56 wt %, based on the combined weight of urea, the urea-aldehyde resin, the liquid medium, and the sugar.

The urea mixture can have a urea concentration of at least 5 wt %, at least 10 wt %, at least 15 wt %, at least 20 wt, at least 25 wt %, at least 30 wt %, at least 35 wt %, at least 40 wt %, at least 43 wt %, at least 45 wt %, or at least 47 wt %, based on the combined weight of urea, the urea-aldehyde resin, the liquid medium, and the sugar. The urea mixture can have a urea concentration from a low of about 5 wt %, about 15 wt %, or about 20 wt %, to a high of about 40 wt %, about 50 wt %, or about 60 wt %, based on the combined weight of urea, the urea-aldehyde resin, the liquid medium, and the sugar. In another example, the urea mixture can have a urea concentration about 30 wt % to about 65 wt %, about 5 wt % to about 15 wt %, about 17 wt % to about 26 wt %, about 20 wt % to about 65 wt %, about 30 wt % to about 55 wt %, about 22 wt % to about 40 wt %, about 43 wt % to about 58 wt %, about 40 wt % to about 65 wt %, about 23 wt % to about 35 wt %, about 18 wt % to about 39 wt %, or about 33 wt % to about 60 wt %, based on the combined weight of urea, the urea-aldehyde resin, the liquid medium, and the sugar.

The urea mixture can have a sugar concentration from a low of about 0.5 wt %, about 1 wt %, about 2 wt %, about 3 wt %, or about 4 wt %, to a high of about 7 wt %, about 10 wt %, about 12 wt %, or about 15 wt %, based on the combined weight of urea, the urea-aldehyde resin, the liquid medium, and the sugar. In another example, the urea mixture can have a sugar concentration of about 1 wt % to about 3 wt %, about 2 wt % to about 8 wt %, about 2 wt % to about 4 wt %, about 3 wt % to about 6 wt %, about 5 wt % to about 10 wt %, about 9 wt % to about 12 wt %, or about 12 wt % to about 15 wt %, based on the combined weight of urea, the urea-aldehyde resin, the liquid medium, and the sugar. In another example, the urea mixture can have a sugar concentration of about 1.5 wt % to about 4 wt %, about 3 wt % to about 5 wt %, about 4 wt % to about 6 wt %, about 3 wt % to about 7 wt %, or about 7 wt % to about 10 wt %, based on the combined weight of urea, the urea-aldehyde resin, the liquid medium, and the sugar. In another example, the urea mixture can have a sugar concentration of at least 1 wt %, at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, or at least 15 wt %, based on the combined weight of urea, the urea-aldehyde resin, the liquid medium, and the sugar.

The urea mixture can have a liquid medium concentration from a low of about 5 wt %, about 15 wt %, or about 20 wt %, to a high of about 40 wt %, about 50 wt %, or about 60 wt %, based on the combined weight of urea, the urea-aldehyde resin, the liquid medium, and the sugar. In another example, the urea mixture can have a liquid medium concentration of about 10 wt % to about 60 wt %, about 5 wt % to about 20 wt %, about 20 wt % to about 40 wt %, about 40 wt % to about 50 wt %, about 20 wt % to about 70 wt %, about 3 wt % to about 35 wt %, about 7 wt % to about 45 wt %, or about 10 wt % to about 40 wt %, based on the combined weight of urea, the urea-aldehyde resin, the liquid medium, and the sugar. In another example, the urea mixture can have a liquid medium of about 1.5 wt % to about 15 wt %, about 3 wt % to about 8 wt %, about 9 wt % to about 15 wt %, about 11 wt % to about 13 wt %, about 7 wt % to about 21 wt %, or about 5 wt % to about 20 wt %, based on the combined weight of urea, the urea-aldehyde resin, the liquid medium, and the sugar.

The viscosity of the urea mixture can vary widely. For example, the viscosity of the urea mixture can be from a low of about 10 cP, about 100 cP, about 250 cP, or about 700 cP to a high of about 1,000 cP, about 1,250 cP, about 1,500 cP, about 2,000 cP, or about 2,200 cP at a temperature of about 25° C. In another example, the urea mixture can have a viscosity of about 100 cP to about 1,000 cP, about 10 cP to about 25 cP, about 100 cP to about 200 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the urea mixture can have a viscosity of about 10 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be measured using a Brookfield viscometer. For example, the Brookfield Viscometer can be equipped with a small sample adapter such a 10 mL adapter and the appropriate spindle to maximize torque such as a spindle no. 31.

The urea mixture can have a non-volatile solids content of at least 40 wt %, at least 50 wt %, at least 55 wt %, at least 60 wt %, at least 65 wt %, at least 70 wt %, at least 75 wt %, or at least 80 wt %, based on the combined weight of urea, the urea-aldehyde resin, the liquid medium, and the sugar. For example, the urea mixture can have non-volatile solids content from a low of about 45 wt %, about 50 wt %, about 47 wt %, or about 52 wt % to a high of about 60 wt %, about 65 wt %, about 70 wt %, or about 80 wt %, based on the combined weight of urea, the urea-aldehyde resin, the liquid medium, and the sugar. For example, the urea mixture can have a non-volatile solids content of about 40 wt % to about 55 wt %, about 40 wt % to about 70 wt %, about 55 wt % to about 65 wt %, about 55 wt % to about 67 wt %, about 57 wt % to about 75 wt %, about 62 wt % to about 75 wt %, or about 65 wt % to about 80 wt %, based on the combined weight of the urea, the urea-aldehyde resin, the liquid medium, and the sugar. In another example, the urea mixture can have a non-volatile solids content of at least 55 wt %, at least 56 wt %, at least 57 wt %, at least 58 wt %, at least 59 wt %, at least 60 wt %, at least 61 wt %, at least 62 wt %, at least 63 wt %, at least 64 wt %, at least 65 wt %, or at least 66 wt %, based on the combined weight of the urea, the urea-aldehyde resin, the liquid medium, and the sugar. In another example, the urea mixture can have a non-volatile solids content of at least 55 wt %, at least 56 wt %, at least 57 wt %, at least 58 wt %, at least 59 wt %, at least 60 wt %, at least 61 wt %, at least 62 wt %, at least 63 wt %, at least 64 wt %, at least 65 wt %, or at least 66 wt % and up to about 67 wt %, about 68 wt %, about 69 wt %, about 70 wt %, about 71 wt %, about 73 wt %, about 75 wt %, about 77 wt %, or about 80 wt %, based on the combined weight of the urea, the urea-aldehyde resin, the liquid medium, and the sugar. As used herein, the non-volatile solids content of a composition can be measured by determining the weight loss upon heating a small sample, e.g., 1-5 gram, of the resin composition to a suitable temperature, e.g., 105° C., and a time sufficient, e.g., 3 hours, to remove the liquid. By measuring the weight of the sample before and after heating, the percent solids in the sample can be directly calculated or otherwise estimated.

The urea mixture can be used in the production of one or more products, stored on site for future use, transported to another location and stored, used in the production of one or more products, and/or used to reduce the concentration of one or more combustion gas by products, e.g., nitrogen oxides, in a combustion effluent. Indicators of storage stability for the urea mixture are changes in viscosity and precipitation. The urea mixture can have a storage stability of about 1 day or more, about 2 days or more, about 3 days or more, about 4 days or more, about 5 days or more, about 6 days or more, about one week or more, about two weeks or more, about 3 weeks or more, or about 4 weeks or more. In other words, the urea mixture can be produced by mixing the urea-aldehyde resin, the sugar, the urea, and the liquid medium to form a stable composition having a storage stability or shelf life from a day, several days, a month, three months, or more than nine months.

The urea mixture can retain good solubility at low temperatures. The urea mixture can form less precipitate at a given low temperature than a similar urea mixture that does not contain a sugar component. Also, when a precipitate does form in the urea mixture at low temperatures, the precipitate readily re-solubilizes upon heating the resin mixture. These solubility properties can provide a broad temperature range at which the resin mixture can be stored while still retaining its efficacy as a formaldehyde scavenger.

The urea mixture can have a freezing point from a low of about −12° C., about −7° C., about 0° C., to a high of about 10° C., about 15° C., about 20° C. For example, the urea mixture can have a freezing point of about −12° C. to about −7° C., about −10° C. to about −2° C., about −2° C. to about 2° C., about 2° C. to about 6° C., about 5° C. to about 10° C., and about 10° C. to about 20° C.

Any of a wide variety of methods can be used for polymerizing the urea and the aldehyde to produce the urea-aldehyde resin. The urea-aldehyde resin can be synthesized under controlled molar ratios and reaction conditions. The aldehyde, the urea, and one or more catalysts can be directed, charged, or otherwise introduced to a reaction vessel to provide a reaction mixture or a urea-aldehyde resin therein. The reaction can be conducted in an aqueous solution, liquid medium, and/or form water from the condensation reactions.

The urea-aldehyde resin can be synthesized at a molar ratio of aldehyde to urea from a low of about 1.4:1, about 1.6:1, about 1.8:1, or about 2:1 to a high of about 2.8:1, about 3:1, about 3.3:1, or about 3.5:1. For example, the urea-aldehyde resin can have a molar ratio of aldehyde to urea of about 1.6:1 to about 2.4:1, about 1.4:1 to about 3.3:1, about 1.5:1 to about 2:1, about 1.9:1 to about 2.3:1, about 2.1:1 to about 2.9:1, about 2.6:1 to about 3.2:1, or about 2.4:1 to about 3.2:1. In other examples, the urea-aldehyde resin can have an initial molar ratio of aldehyde to urea of about 1.8:1 to about 2.3:1, about 2.4:1 to about 3.5:1, about 3:1 to about 3.5:1, about 2.6:1 to about 2.9:1, about 3:1 to about 3.3:1, or about 2.9:1 to about 3.4:1.

The urea-aldehyde resin can have a number average molecular weight from a low of about 500, about 700, or about 900 to a high of about 3,000, about 4,000, or about 5,000. In another example, the urea-aldehyde resin can have a weight average molecular weight of about 500 to about 700, about 650 to about 950, about 900 to about 1,200, about 1,100 to about 1,400, about 1,300 to about 1,700, about 1,600 to about 2,000, about 1,900 to about 2,400, about 2,300 to about 2,900, about 2,800 to about 3,200, about 3,100 to about 3,600, about 3,500 to about 4,000, about 3,900 to about 4,400, or about 4,300 to about 5,000. In another example, urea-aldehyde resin can have a weight average molecular weight of about 600 to about 1,000, about 1,000 to about 3,000, about 2,000 to about 4,000, about 3,000 to about 5,000. The number average and weight average molecular weights can be measured using gel permeation chromatography ("GPC"), also known as size exclusion chromatography ("SEC"). This technique utilizes an instrument containing columns packed with porous beads, an elution solvent, and detector in order to separate polymer molecules of different sizes, and is well known to those skilled in the art.

The polymerization of the aldehyde and the urea can be carried out for a time from a low of about 1 minute, about 10 minutes, or about 30 minutes to a high of about 8 hours, about 10 hours, or about 20 hours. For example, polymerization of the aldehyde and the urea can be carried out for a time of about 10 minutes to about 240 minutes, about 20 minutes to about 180 minutes, about 10 minutes to about 1 hour, about 1 hour to about 7 hours, or about 2 hours to about 20 hours. The polymerization can be carried out until the urea-aldehyde resin exhibits one or more desired properties. For example, the polymerization of the aldehyde monomer and the urea monomer can be carried out until the urea-aldehyde resin has a desired molecular weight and/or viscosity.

The reaction or polymerization between the aldehyde and the urea can be carried out over broad temperature ranges. For example, the reaction or polymerization of the aldehyde and the urea can be maintained at a temperature of about room temperature (e.g., about 25° C.) to about 150° C. The heat from the exothermic reaction between the aldehyde and urea can increase the temperature of the reaction mixture from a low of about 50° C., about 55° C., about 60° C., about 65° C., or about 70° C. to a high of about 75° C., about 80° C., about 85° C., about 90° C., about 92° C., about 94° C., about 96° C., about 98° C., or about 100° C. In another example, the heat from the exothermic reactions between the aldehyde and the urea can increase the temperature of the reaction mixture from about 50° C. to about 100° C., about 55° C. to about 100° C., about 60° C. to about 100° C., about 65° C. to about 100° C., or about 70° C. to about 125° C.

The viscosity of the urea-aldehyde resin can be from a low of about 10 centipoise ("cP"), about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the urea-aldehyde resin can have a viscosity of about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the urea-aldehyde resin can have a viscosity of about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be measured using a Brookfield viscometer. For example, the Brookfield Viscometer can be equipped with a small sample adapter such a 10 mL adapter and the appropriate spindle to maximize torque such as a spindle no. 31.

While not wishing to be bound by theory, the polymerization forming the urea-aldehyde resin can be thought to occur in two stages. For example, in making a urea-formaldehyde resin the first stage can be thought of as an addition reaction between the urea and the aldehyde. This first stage can take place over the entire pH scale with the reaction rates being dependent, at least in part, on the pH. For example, the first stage can be performed under alkaline conditions where the urea is deprotonated with a subsequent nucleophilic attack on the aldehyde to form mono-, di-, and trimethylolureas. The second stage can be thought of as a condensation reaction of the methylolureas to form low molecular weight urea-aldehyde polymers. The reaction rates of these condensation reactions can be dependent upon pH. For example, the reaction rates for the condensation reactions can be increased by performing the reaction under acidic conditions. The addition reactions of the first stage and the condensation reactions of the second stage have different pH profiles for their respective reaction rates. These different pH profiles can be used to synthesize urea-aldehyde resins having one or more desired properties, such as molecular weight, tack, gel time, and spreadability. For example, the first stage can be performed under basic conditions to allow for the formation of the methylolureas while limiting the condensation of the resulting methylolureas. Once the desire amount methylolation has occurred the pH can be lowered to increase the reaction rates of the condensations of the methylolureas. Additional urea can be added in one or more portions until a desired aldehyde to urea molar ratio is achieved. The polymerization can be carried out until a desired molecular weight and/or viscosity has been reached. The polymerization can then be quenched by cooling and neutralizing the reaction mixture. The polymerization produces water, which can be removed by distillation to provide a urea-aldehyde resin with a desired solids content. The urea-aldehyde resin can be cured through the addition of a catalyst and/or the application of heat.

Based upon the desired properties of the resulting urea-aldehyde resin, the pH of the urea-aldehyde resin or the reaction mixture can be adjusted with the addition of a base and/or acid catalysts to optimize the reaction rates for the polymerization reaction. The reaction rates for the addition reactions of the aldehyde monomer and the urea monomer can be increased and/or optimized by adjusting the pH of the reaction mixture from a low of about 4, about 6.5, about 6.7, or about 6.9 to a high of about 7.2 to a high of about 7.4, about 7.6, about 7.8, or about 6.8. The reaction rates for the condensation can be increased and/or optimized by adjusting the pH of the reaction mixture from a low of about 6.5, about 6.7, or about 6.9 to a high of about 7.2 to a high of about 7.4, about 7.6, about 7.8, or about 8.5, about 9.0, or about 9.5. Depending upon the desired resin properties, the pH of the reaction mixture can be changed throughout polymerization.

The reaction can be conducted so that the resulting urea-aldehyde resin or the reaction mixture can have a non-volatile solids content of at least about 20 wt %, at least about 30 wt %, at least about 35 wt %, or at least about 45 wt %, based on the combined weight of the urea-aldehyde resin, the catalyst, and the liquid medium. The non-volatile solids content can be from a low of about 20 wt %, about 30 wt %, about 40 wt %, about 45 wt %, or about 50 wt % to a high of about 55 wt %, about 60 wt %, about 65 wt %, about 70 wt %, about 75 wt %, or about 80 wt %, based on the combined weight of the urea-aldehyde resin and a liquid medium. For example, urea-aldehyde resin can have a non-volatile solids content of about 40 wt % and about 48 wt %, about 40 wt % and about 44 wt %, about 45 wt % and about 65 wt %, or about 50 wt % and about 60 wt %, based on the combined weight of the urea-aldehyde resin, the catalyst, and the liquid medium.

Further additions of urea can be added to the reaction mixture or the urea-aldehyde resin to provide an intermediate mixture having an aldehyde to urea molar ratio of about 0.2:1 to about 0.7:1 and adding a sugar to the intermediate mixture to produce a urea mixture comprising of about 2 wt % to about 8 wt % sugar, based on the combined weight of the urea mixture. The intermediate mixture can have a molar ratio of aldehyde to urea, which includes urea reacted into the urea-aldehyde resin and free urea, from a low of about 0.2:1, about 0.3:1, or about 0.4:1, to a high of about 0.8:1, about 1:1, or about 1.5:1. For example, the urea mixture can have a total molar ratio of aldehyde to urea, which includes urea reacted into the urea-aldehyde resin and free urea, of about 0.2:1 to about 0.25:1, about 0.25:1 to about 0.35:1, about 0.35:1 to about 0.4:1, about 0.37:1 to about 0.45:1, about 0.43:1 to about 0.5:1, about 0.5:1 to about 0.6:1, about 0.55:1 to about 0.7:1, about 0.7:1 to about 0.8:1, or about 1:1 to about 1.5:1. The urea can be added to the reaction mixture or the aldehyde resin in a molar excess of urea resulting in "free" or unreacted urea. The free urea can be in dynamic equilibrium through reversible condensation reactions with the urea that has been reacted into the urea-aldehyde resin.

At a desired reaction endpoint, the reaction rates for the polymerization reaction can be substantially reduced by neutralizing the pH of the reaction mixture or the intermediate mixture. The reaction mixture or the intermediate mixture can be neutralized and stored at a pH of about 6.5 to about 9. The particular conditions, e.g., the temperature and/or pressure of the reaction mixture or the intermediate mixture undergoing polymerization, the particular aldehyde monomer and urea monomer in the reaction mixture reaction mixture or the intermediate mixture, and/or the molar ratios between the particular aldehyde compound(s) and amino compound(s) of the reaction mixture or the intermediate mixture, can affect the particular pH and/or other conditions, e.g., temperature, that cause the polymerization substantially terminate.

The sugar can be mixed with the reaction mixture or the intermediate mixture to produce the urea mixture. The sugar can provide stability, increase the viscosity, and/or increase the non-volatile solids content. The sugar can be mixed, blended, stirred, or otherwise combined with the reaction mixture or the intermediate mixture in any manner to produce a urea mixture. The sugar can be mixed or combined with the reaction mixture or the intermediate mixture during the synthesis of the resin, after the urea-aldehyde resin has been formed, or a mixture thereof. The sugar can undergo a chemical reaction to form a chemical bond with the urea-aldehyde resin and/or remain as an individual or discrete component in a mixture with the urea-aldehyde resin. The sugar can be added as a solid or a liquid; it can also be added as a solution. The solvent and/or liquid medium for the sugar addition can be water, an organic solvent, or any combination or mixture thereof.

Additionally, it is believed that the free or unreacted amount of the aldehyde used to produce the urea-aldehyde resin in the urea mixture can contains less than 3 wt %, less than 2 wt %, less than 1.5 wt %, less than 1 wt %, less than 0.7 wt %, less than 0.5 wt %, less than 0.4 wt %, less than 0.3 wt %, less than 0.2 wt %, less than 0.1 wt %, less than 0.09 wt %, less than 0.08 wt %, less than 0.07 wt %, less than 0.06 wt %, or less than 0.05 wt % free or unreacted aldehyde monomer. As such, the aldehyde-based resin as well as products made therefrom can exhibit reduced aldehyde emission while still maintaining a reduced cure time or acceptable rate of cure and/or products having sufficient strength. The amount of free aldehyde can be measured according ASTM D1979-97.

The urea can be provided in many forms. Solid urea, solutions of urea, and/or urea combined with another moiety can be used. For example, urea can be combined with another moiety, such as formaldehyde and/or urea-formaldehyde adducts, often in aqueous solution. Illustrative urea-formaldehyde products can include, but are not limited to, Urea-Formaldehyde Concentrate ("UFC"). These types of products can be as discussed and described in U.S. Pat. Nos. 5,362,842 and 5,389,716, for example. The concentration of the urea monomer can be from a low of about 3 wt %, about 5 wt %, about 7 wt %, about 10 wt %, about 15 wt %, or about 20 wt % to a high of about 30 wt %, about 45 wt %, about 50 wt %, about 55 wt %, about 60 wt %, or about 70 wt %, based on the total weight of the liquid medium, the urea monomer, the formaldehyde monomer, and the catalyst.

Even though melamine is also reactive with formaldehyde, for purpose of the present disclosure "melamine" can be expressly excluded from the urea mixture. As used herein, the term "substantially free from melamine" means the urea mixture contains less than 10 wt %, less than 9.5 wt %, less than 9 wt %, less than 8.5 wt %, less than 8 wt %, less than 7 wt %, less than 6 wt %, less than 5 wt %, less than 4 wt %, less than 3 wt %, less than 2 wt %, less than 1 wt %, less than 0.5 wt %, less than 0.1 wt %, less than 0.05 wt %, less than 0.01 wt %, less than 0.005 wt %, or less than 0.001 wt %, or less than 0.0005 wt % of melamine, based on a total solids weight of the urea mixture. In at least one embodiment, the urea mixture can be free from melamine. Said another way, the urea mixture can contain no melamine.

The aldehyde monomer can include formaldehyde and the urea-aldehyde resin can include a urea-formaldehyde resin. Formaldehyde for making a suitable urea-formaldehyde resin can be provided in many forms. The formaldehyde can be or include paraform (solid, polymerized formaldehyde), formalin solutions (aqueous solutions of formaldehyde, sometimes with methanol, in 37%, 44%, or 50% formaldehyde concentrations), Urea-Formaldehyde Concentrate, and/or formaldehyde gas in lieu of or in addition to other forms of formaldehyde can also be used. The concentration of the formaldehyde monomer can be from a low of about 3 wt %, about 5 wt %, about 7 wt %, about 10 wt %, about 15 wt %, or about 20 wt % to a high of about 30 wt %, about 45 wt %, about 50 wt %, about 55 wt %, about 60 wt %, or about 70 wt %, based on the total weight of the liquid medium, the urea monomer, the formaldehyde monomer, and the catalyst.

The aldehyde can include one or more aldehyde monomers. The one or more aldehyde monomers can be or include one or more substituted aldehyde monomers, one or more unsubstituted aldehyde monomers, or any combination or mixture of substituted and/or unsubstituted aldehyde monomers. The aldehyde monomers can include any suitable aldehyde or combination of aldehydes. The aldehyde monomers can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, acetaldehyde, propionaldehyde, butyraldehyde, furfuraldehyde, benzaldehyde, or any combination thereof.

The aldehyde monomer can be or include, but is not limited to, unsubstituted aldehyde compounds and/or substituted aldehyde compounds. Aldehyde compounds suitable for use as the aldehyde monomer component can be represented by the formula RCHO, where R is hydrogen or a hydrocarbon radical. Illustrative hydrocarbon radicals can include from 1 to about 8 carbon atoms. In another example, suitable aldehyde monomer can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination or mixture thereof. One or more other aldehydes, such as glyoxal can be used in place of or in combination with formaldehyde and/or other aldehydes. In at least one example, the aldehyde compound can include formaldehyde, UFC, or any combination or mixture thereof.

The aldehyde monomer can be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehyde compounds that include three (3) or more carbon atoms and have two aldehyde functional groups (—CHO) can be represented by the following formula:

where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination or mixture thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination or mixture thereof. The aldehyde group in the multifunctional aldehyde compound can exist in other forms, e.g., as a hydrate. As such, any form or derivative of a particular multifunctional aldehyde compound can be used to prepare the binder compositions discussed and described herein. For example, in the context of glyoxylic acid, glyoxylic acid, glyoxylic acid monohydrate, and/or glyoxylate can be combined with the tannins and the Lewis acid to produce the binder composition.

One or more acids and/or one or more bases and/or one or more catalysts can be used to polymerize the urea-aldehyde resin. Illustrative acids can include sulfuric acid, maleic acid, glacial acetic acid, formic acid, urea-sulfonic acids solution, or any combination thereof. The acid can be a Lewis acid. Illustrative Lewis acids can include, but are no limited to, aluminum chloride, zinc chloride, aluminum bromide, boron fluoride, or any combination thereof. The base can include alkali metal and alkali earth hydroxides, alkali metal and alkali earth carbonates, amines, acids, or any combination thereof. Illustrative alkali metal and alkali earth hydroxides can include, but are not limited to, lithium hydroxide, sodium hydroxide and potassium hydroxide. Illustrative alkali metal carbonates can include, but are not limited to, sodium carbonate and potassium carbonate. Illustrative amines can include, but are not limited to, ammonia, triethylene tetraamine, diethylene triamine, triethylenetetramine and/or GP® 4590 k-20 precatalyst (available from Georgia-Pacific Chemicals LLC). Suitable catalysts that can be used to at least partially cure the resins can include, but are not limited to, one or more metal salts, or any combination thereof. Illustrative metal salts can include, but are not limited to, salts of sodium, potassium, aluminum, magnesium, zinc, or any combination thereof. For example, the catalyst can be or include sodium nitrate, aluminum sulfate, ammonium hydrogen phosphate, ammonium persulfate, ammonium chloride, ammonium nitrate, ammonium sulfate, or any combination thereof. The catalyst can be an organic anhydride. Illustrative anhydrides can include, but are not limited to, maleic anhydride, phthalic anhydride, acetic anhydride, or any combination thereof. The catalyst concentrations can be about 0.2 wt % to about 6 wt %, such as about 0.5 wt % to about 3 wt %, based on the combined weight of the urea-aldehyde resin and catalyst. In one example, at least about 0.005 mol of catalyst per mol of aldehyde can be used, with an amount of about 0.01 to about 1 mol per mol of aldehyde. The catalyst can be added initially to the aldehyde monomer and urea monomer reaction mixture or the catalyst can be added incrementally in two or more additions or continuously over time.

Suitable acids for catalyzing and adjusting the pH of the reaction mixture can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bicarbonate, sodium hydrosulfide, sodium bisulfate, sodium metabisulfite, or any combination thereof.

Suitable bases or alkaline compounds for catalyzing and adjusting the pH of the reaction mixture can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, cesium hydroxide, aqueous solutions thereof, any combination thereof, or any mixture thereof. Illustrative carbonates can include, but are not limited to, sodium carbonate, potassium carbonate, ammonium carbonate, aqueous solutions thereof, any combination thereof, or any mixture thereof. Illustrative amines can include, but are not limited to, alkanolamines, polyamines, aromatic amines, or any combination thereof. Illustrative alkanolamines can include, but are not limited to, monoethanolamine ("MEA"), diethanolamine ("DEA"), triethanolamine ("TEA"), or any combination thereof. In some examples, the alkanolamine can be a tertiary alkanolamine, such as triethanolamine. An alkanolamine is defined as a compound that has both amine and hydroxyl functional groups as illustrated by diethanolamine, triethanolamine, 2-(2-amineethoxy)ethanol, amineethyl ethanolamine, aminebutanol and other aminealkanols. Illustrative aromatic amines can include, but are not limited to, benzyl amine, aniline, ortho toluidine, meta toluidine, para toluidine, n-methyl aniline, N—N'-dimethyl aniline, diphenyl and triphenyl amines, 1-naphthylamine, 2-naphthylamine, 4-aminephenol, 3-aminephenol and 2-aminephenol. Illustrative polyamines can include, but are not limited to, diethylenetriamine ("DETA"), triethylenetetramine ("TETA"), tetraethylenepentamine ("TEPA"). Other polyamines can include, for example, 1,3-propanediamine, 1,4-butanediamine, polyamidoamines, and polyethylenimines.

The sugar can be or include one or more monosaccharides, one or more disaccharides, or any combination or mixture thereof. Suitable monosaccharides can be in the aldose or ketose form, including a triose, a tetrose, a pentose, a hexose, or a heptose. Illustrative monosaccharides can include, but are not limited to, glyceraldehyde, erythrose, threose, erythrulose, ribose, arabinose, xylose, lyxose, ribulose, arabulose, xylulose, lyxulose, glucose (e.g., dextrose), mannose, galactose, allose, altrose, talose, gulose, idose, fructose, psicose, dendroketose, sorbose, tagatose, gentiobiose, sedoheptulose, or any combination thereof. Suitable disaccharides can be in the aldose or ketose form. Suitable disaccharides can include, but are not limited to, sucrose, lactose, maltose, or a combination thereof. The sugar can be added as a solid, a liquid, or a solution. For example, the sugar can be a syrup, such as high fructose corn syrup.

The sugar can be or include one or more sugar equivalent molecules. Suitable sugar equivalent molecules can include, but are not limited to, furfural, pyruvaldehyde, acetaldehyde, dihydroxyacetone, crotonaldehyde, 2-furaldehyde, quinine ascorbic acid, glycolaldehyde, glycolaldehyde dimer, trans-3-(2-furyeacrolein, acrolein, 2,5-di(hydroxymethyl)furan, furfurol, 5-hydroxymethylfurfural, 5-methylfurfurol, 5-methylfurfural, 4-hydroxycrotonaldehyde, cinnamaldehyde, or any combination or mixture thereof. Suitable sugars or their equivalents can optionally be substituted with hydroxy, halo, alkyl, and alkoxy groups. It is common for such compounds to have one or more chiral centers, and in those circumstances any of the optical isomers can be used, including racemic mixtures, or other diastereomeric mixtures of the various optical isomers.

One or more liquid media can be included in the urea mixture. The liquid medium can be mixed, blended, or otherwise combined into the urea mixture. The liquid medium can include water. The water can be added or it can be generated during the polymerization reaction of the urea-aldehyde resin or a combination of both. The liquid medium can include one or more polar aprotic solvents, one or more polar protic solvents, or any combination thereof. Illustrative polar aprotic solvents can include, but are not limited to, tetrahydrofuran ("THF"), dimethyl sulfoxide ("DMSO"), N-methylpyrrolidone ("NMP"), dimethyl acetamide, acetone, or any combination thereof. Illustrative polar protic solvents can include, but are not limited to, water, methanol, ethanol, propanol, butanol, or any combination thereof. Other liquid mediums can include ketones, such as methyl ethyl ketone.

The urea mixture can be mixed, blended, or otherwise combined with an aldehyde-based resin or second resin as a formaldehyde scavenger. For example, the urea mixture can be combined with an aldehyde-based resin that includes formaldehyde. Such aldehyde-based resins can be used as adhesives or binders for composite lignocellulose products such as particle boards, fiber boards, panels, plywood, and the like, for thermal insulation products and for other glass fiber mat applications. The aldehyde-based resin can be made by reacting or polymerizing the same monomers as the urea-aldehyde resin or different monomers. Examples of aldehyde-based resins or second resins that can be used with urea mixture can include, but are not limited to, urea-formaldehyde resins, phenol-formaldehyde resins, melamine-formaldehyde resins, melamine-urea-formaldehyde resins, melamine-urea-phenol-formaldehyde resins, or any mixture thereof. For example, urea-aldehyde resins that can benefit from the urea mixture can have a molar ratio of formaldehyde to urea (F:U) of about 0.5 to about 5. For such formaldehyde-based resins, decreasing the F:U ratio in the UF resin can be desirable to reduce the amount of formaldehyde in the resin. However, the ratio can only be reduced so far before desired performance characteristics of the UF resin are affected. For example, internal bond strength of the resin is reduced at low F:U mole ratios, particularly at ratios less than 1.1:1. Other performance characteristics can include increased glue consumption, deteriorated cold tack, deteriorated strength, and increased swelling. Using the urea mixture or formaldehyde scavenger can reduce the concentration of the formaldehyde in the resin without a significant reduction in desired performance characteristics.

Many formaldehyde-based resins that can be used are commercially available. One particularly useful class of formaldehyde-based resins for use in preparing resin systems is disclosed in U.S. Pat. No. 5,362,842, the disclosure of which is incorporated herein by reference. Urea formaldehyde resins such as the types sold by Georgia Pacific Chemicals, LLC (e.g., GP-2928 and GP-2980 urea-formaldehyde resins) can be used.

The urea mixture can be added to the formaldehyde-based resin or second resin to produce a resin composition. The urea mixture can be added to the formaldehyde-based resin in an amount from a low of about 0.1 wt %, about 0.5 wt %, about 1 wt %, or about 2 wt % to a high of about 5 wt %, about 7 wt %, about 10 wt %, or about 15 wt %, based on the total weight of the urea-aldehyde resin. In other examples, the urea mixture can be added to the formaldehyde-based resin in an amount of about 0.1 wt % to about 1 wt %, about 1 wt % to about 2 wt %, about 2 wt % to about 5 wt %, about 5 wt % to about 10 wt %, about 10 wt % to about 15 wt %, or about 15 wt % to about 20 wt %, based on the total weight of the urea mixture and the formaldehyde-based resin. In other examples, the urea mixture can be added to the formaldehyde-based resin formaldehyde-based resin in an amount of about 0.5 wt % to about 4 wt %, about 1 wt % to about 3 wt %, about 1.5 wt % to about 5.5 wt %, about 4.5 wt % to about 8 wt %, about 3.5 wt % to about 10 wt %, or about 5.5 wt % to about 7.5 wt %, based on the total weight of the urea mixture and the formaldehyde-based resin. Such amounts of the urea mixture can be up to about 50 wt % of the total weight of the solids content of the resin composition. The urea mixture can be added to a formaldehyde-based resin before the formaldehyde-based resin is cured. The urea mixture can be added to the formaldehyde-based resin at room temperature (e.g., about 25° C.) or at an elevated temperature, e.g., of about 30° C. to about 60° C.

The urea mixture can be used in place of or in combination with other formaldehyde scavenger compounds. For example, the urea mixture can be used to replace urea as a scavenger compound in its entirety, or may be used to reduce the amount of urea used as a scavenger in urea-aldehyde resins. The consideration to use the formaldehyde scavenger resin as the sole formaldehyde scavenger depends on the desired properties of the final composite product and cost.

The formaldehyde-based resin can include, but is not limited to, one or more additives. Illustrative additives can include, but are not limited to, waxes and/or other hydrophobic additives, water, filler material(s), extenders, surfactants, release agents, dyes, fire retardants, formaldehyde scavengers, biocides, or any combination thereof. For composite wood products, such as plywood, typical filler material(s) can include, but are not limited to, ground pecan and/or walnut shells, and typical extenders can include, for example, wheat flour. Other suitable extenders can include, but are not limited to, polysaccharides, sulfonated lignins, and the like. Illustrative polysaccharides can include, but are not limited to, starch, cellulose, gums, such as guar and xanthan, alginates, pectin, gellan, or any mixtures thereof. Suitable polysaccharide starches can include, for example maize or corn, waxy maize, high amylose maize, potato, tapioca, wheat starch, or any mixtures thereof. Other starches such as genetically engineered starches can include, but are not limited to, high amylose potato and potato amylopectin starches. Illustrative sulfonated lignins can include, but are not limited to, sodium lignosulfonate and ammonium lignosulfonate.

The aldehyde-based resin can include, but is not limited to, additives such as ammonia, alkanolamines, or polyamines, such as an alkyl primary diamine, e.g., ethylenediamine ("EDA"). Other additives, such as ethylene ureas, and primary, secondary and tertiary amines, for example, dicyanodiamide, can also be incorporated into UF resins. Concentrations of these additives in the reaction mixture can vary in an amount of about 0.05% to about 20.0% by weight of the UF resin solids. These types of additives can promote hydrolysis resistance, polymer flexibility and lower formaldehyde emissions in the cured resin. Further urea additions for purposes of scavenging formaldehyde or as a diluent also can be used. Urea-formaldehyde resins can also have a water dilutability of about 1:1 to about 100:1, such as about 5:1 or greater.

If the aldehyde-based resin includes one or more additives, the amount of each additive can be from a low of about 0.01 wt % to a high of 50 wt %, based on the weight of the additive and the aldehyde-based resin. For example, the amount of any given additive can be from a low of about 0.01 wt %, about 0.05 wt %, about 0.1 wt %, about 0.5 wt %, or about 1 wt % to a high of about 3 wt %, about 5 wt %, about 7 wt %, or about 9 wt %, based on the total weight of the additive and the aldehyde-based resin. In another example, the amount of any given additive can be from a low of about 1 wt %, about 5 wt %, about 10 wt %, about 15 wt %, or about 20 wt % to a high of about 25 wt %, about 30 wt %, about 35 wt %, about 40 wt %, or about 45 wt %, based on the total weight of the additive and the aldehyde-based resin.

A lignocellulosic composite product can be made by contacting one or more lignocellulosic substrates with a resin composition, and at least partially curing the resin composition mixture to produce a composite product. The resin composition can be cured via any number of methods, e.g., with the addition of one or more acids, bases, and/or catalysts, the application of heat, and/or pressure, or any combination thereof, to produce the composite product. The resin composition can include the urea mixture and an aldehyde-based resin.

As used herein, the terms "curing," "cured," and similar terms are intended to refer to the structural and/or morphological change that occurs in the resin composition as it is cured to cause covalent chemical reaction (crosslinking), ionic interaction or clustering, improved adhesion to a substrate, phase transformation or inversion, and/or hydrogen bonding. As used herein, the phrases "at least partially cure," "at least partially cured," and similar terms are intended to refer to the resin composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

The amount of catalyst that can be added to the resin composition to initiate or start curing of the resin composition can be from a low of about 0.01 wt %, about 1 wt %, about 3 wt %, or about 5 wt % to a high of about 30 wt %, about 40 wt %, about 45 wt %, or about 50 wt %, based on the combined weight of the urea mixture, the aldehyde-based resin, and the catalyst. For example, the amount of catalyst that can be added to the resin composition to initiate or start curing of the resin composition can be in an amount of about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the urea mixture, the aldehyde-based resin, and the catalyst.

The amount of the resin composition applied to the lignocellulose substrates can be from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on dry a weight of the lignocellulose substrates. For example, the mixture of the lignocellulose substrates and the resin composition can contain about 5 wt % to about 15 wt %, about 8 wt % to about 14 wt %, about 10 wt % to about 12 wt %, or about 7 wt % to about 10 wt % of the resin composition, based on a dry weight of the lignocellulose substrates. In another example, the mixture of the lignocellulose substrates and the resin composition can contain about 1 wt % to about 4 wt %, about 1.5 wt % to about 5 wt %, about 2 wt % to about 4 wt %, about 2 wt % to about 6 wt %, or about 0.5 wt % to about 5.5 wt % of the resin composition, based on a dry weight of the lignocellulose substrates.

The resin compositions discussed and described herein can be applied to a plurality of lignocellulose substrates, which can be formed into a desired shape before or after application of the resin composition, and the resin composition can be at least partially cured to produce a lignocellulose composite product. In another example, the resin composition can be applied to a wood or other lignocellulose based veneers and/or substrates and the resin composition can be at least partially cured to adhere or otherwise bond the veneer(s) and/or substrate(s) to one another. In another example, the resin composition can be applied to a plurality of lignocellulose fibers, particles, flakes, strands, and/or the like, formed into a mat or board, and at least partially cured to produce a lignocellulose composite mat or board. The plurality of lignocellulose fibers can be randomly oriented.

The lignocellulose substrates can be contacted with the resin composition by spraying, coating, mixing, brushing, falling film or curtain coater, dipping, soaking, or the like. The lignocellulose substrates contacted with the resin composition can be formed into a desired shape before, during, and/or after at least partial curing of the resin composition. Depending on the particular product, the lignocellulose substrates contacted with the resin composition can be pressed before, during, and/or after the resin composition is at least partially cured. For example, the lignocellulose substrates contacted with the resin composition can be consolidated or otherwise formed into a desired shape, if desired pressed to a particular density and thickness, and heated to at least partially cure the resin composition.

The pressure applied to the lignocellulosic substrates and the resin composition can depend, at least in part, on the particular product. For example, the amount of pressure applied in a particleboard production process can be about 1 MPa to about 5 MPa or about 2 MPa to about 4 MPa. In another example, the amount of pressure applied in a MDF production process can be about 2 MPa to about 7 MPa or about 3 MPa to about 6 MPa. The temperature the product can be heated to produce an at least partially cured product can be from a low of about 100° C., about 125° C., about 150° C., or about 170° C. to a high of about 180° C., about 200° C., about 220° C., or about 250° C. The resin composition at the core or center of the product can be heated to a temperature at a low of about 120° C., about 130° C., about 140° C., about 150° C., or about 155° C. to a high of about 160° C., about 170° C., about 180° C., about 190° C., about 195° C., or about 199° C. The length of time the pressure can be applied can be from a low of about 15 second, about 30 seconds, about 1 minute, about 3 minutes, about 5 minutes, or about 7 minutes to a high of about 10 minutes, about 15 minutes, about 20 minutes, about 30 minutes, about 1 hour, about 2 hours, or more, which can depend, at least in part, on the particular product and/or the particular dimensions, e.g., thickness of the product. For example, the length of time the pressure and/or heat can be applied to the furnish can be about 30 seconds to about 10 minutes, about 30 seconds to about 2 minutes, about 1 minute to about 3 minutes, about 1.5 minutes to about 4 minutes, or about 45 seconds to about 3.5 minutes.

The amount of the resin composition applied to the lignocellulose substrates can be from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on dry a weight of the lignocellulose substrates. For example, a composite product of the lignocellulose substrates can contain about 5 wt % to about 15 wt %, about 8 wt % to about 14 wt %, about 10 wt % to about 12 wt %, or about 7 wt % to about 10 wt % resin composition, based on a dry weight of the lignocellulose substrates. In another example, a composite product of the lignocellulose substrates can contain about 1 wt % to about 4 wt %, about 1.5 wt % to about 5 wt %, about 2 wt % to about 4 wt %, about 2 wt % to about 6 wt %, or about 0.5 wt % to about 5.5 wt % resin composition, based on a dry weight of the lignocellulose substrates.

The lignocellulose substrates (material that includes both cellulose and lignin) can include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The starting material, from which the lignocellulose substrates can be derived from, can be reduced to the appropriate size or dimensions by various processes such as hogging, grinding, hammer milling, tearing, shredding, and/or flaking. Suitable forms of the lignocellulose substrates can include, but are not limited to, chips, flakes, wafers, fibers, shavings, sawdust or dust, or the like. The lignocellulose substrates can have a length of a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer or layer. One or more composite products can be produced from two or more veneer. For example, composite products produced with veneer, in finished form, can include those products typically referred to as laminated veneer lumber ("LVL"), laminated veneer boards ("LVB"), and/or plywood. As such, suitable lignocellulose substrates can include, but are not limited to, wood chips, wood fibers, wood flakes, wood strands, wood wafers, wood shavings, wood particles, wood veneer, or any combination thereof.

Depending, at least in part, on the particular product that can incorporate the veneer(s), the veneers can have any suitable shape, e.g., rectangular, circular, or any other geometrical shape. Typically the veneers can be rectangular, and can have a width from a low of about 1 cm, about 5 cm, about 10 cm, about 15 cm, about 20 cm, or about 25 cm to a high of about 0.6 m, about 0.9 m, about 1.2 m, about 1.8 m, or about 2.4 m. The veneers can have a length from a low of about 0.3 m, about 0.6 m, about 0.9 m, about 1.2 m, or about 1.8 m to a high of about 2.4 m, or about 3 m, about 3.6 m, about 4.3 m, about 4.9 m, about 5.5 m, about 6.1 m, about 6.7 m, about 7.3 m, or about 7.9 m. For example, in a typical veneer product such as plywood, the veneers can have a width of about 1.2 m and a length of about 2.4 m. The veneers can have a thickness from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm.

Illustrative composite wood products or articles produced using the binder compositions can include, but are not limited to, particleboard, fiberboard such as medium density fiberboard ("MDF") and/or high density fiberboard ("HDF"), plywood such as hardwood plywood and/or softwood plywood, oriented strand board ("OSB"), laminated veneer lumber, laminated veneer boards, and the like.

Wood based or wood containing products, such as particleboard, fiberboard, plywood, and oriented strand board, can have a thickness at a low of about 1.5 mm, about 5 mm, or about 10 mm to a high of about 30 mm, about 50 mm, or about 100 mm. Wood based or wood containing products can be formed into sheets or boards. The sheets or boards can have a length of about 1.2 m, about 1.8 m, about 2.4 m, about 3 m, or about 3.6 m. The sheets or boards can have a width of about 0.6 m, about 1.2 m, about 1.8 m, about 2.4 m, or about 3 m.

Another lignocellulose composite product can include panels or other multi-layered products. For example, a lignocellulose product can include two, three, four, five, six, seven, eight, nine, ten, or more individual lignocellulose layers bonded together. The resin composition can be contacted with the lignocellulose substrates of any one or more of the individual layers. In one example, the individual lignocellulose layers of a multi-layer product can be veneer. In another example, the individual lignocellulose layers of a multi-layer product can include a plurality of lignocellulose substrates bonded to one another to produce an individual layer. In another example, a multi-layer lignocellulose product can include one or more individual layers that include veneer and one or more layers that include a plurality of lignocellulose substrates bonded to one another to produce an individual layer.

Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the mixture can be heated can be from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the mixture for about 16 s/mm. In at least one specific example, the mixture can be heated to a temperature of about 160° C. to about 170° C. for a time of 13 s/mm to about 19 s/mm.

The composite product can have an internal bond strength from a low of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 1.7 MPa. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength for each example can be determined according to the test procedure provided for in ASTM D1037-06a.

The composite product can have a density from a low of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to a high of about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, about 1 g/cm$^3$, about 1.05 g/cm$^3$, about 1.1 g/cm$^3$, about 1.15 g/cm$^3$, or about 1.2 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$, to about 1 g/cm$^3$, about 0.5 g/cm$^3$, to about 0.8 g/cm$^3$, about 0.5 g/cm$^3$ to about 0.75 g/cm$^3$, or about 0.64 g/cm$^3$ to about 0.8 g/cm$^3$. In one or more embodiments, the composite product can have density less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

In one or more embodiments, the composite product can have a density less than 1 g/cm$^3$, less than 0.95 g/cm$^3$, less than 0.9 g/cm$^3$, less than 0.85 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the composite product can have a density less than 0.8 g/cm$^3$ and internal bond strength of at least 0.48 MPa. In at least one other specific example, the composite product can have a density less than 0.8 g/cm$^3$ and internal bond strength of at least 0.69 MPa. In at least one other specific example, the composite product can have a density of less than 0.73 g/cm$^3$ and internal bond strength of at least 0.48 MPa. In still another example, the composite product can have a density of less than 0.73 g/cm$^3$ and internal bond strength of at least 0.58 MPa.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute ("ANSI") for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board in particular, oriented strand board made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

The resin composition can be applied to the mating surface of one or more veneer or wood plys. The resin composition can be applied to the wood using conventional equipment, including spray nozzles, atomizing wheels, roll coaters, curtain coaters, foam applicators and the like. The amount of resin composition can depend, at least in part, on the characteristics of the veneer to be bonded and the properties desired in the consolidated panel. The resin composition can be applied to the veneer in an amount of about 40 pounds to about 130 pounds per 1,000 square feet of double glue line, such as about 60 pounds to about 120 pounds per 1,000 square feet of double glue line. The particular application rate or amount can differ with different wood sources. For example, a southern pine which has a higher absorbency capacity than western veneers, such as Douglas Fir, may require greater adhesive spreads.

The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer substrate or layer. One or more composite products can be produced from two or more veneer. For example, composite products produced with veneer shaped substrates, in finished form, can include those products referred to as laminated veneer lumber, laminated veneer boards, and/or plywood.

The various veneer plys can be assembled into a panel and consolidated at an ambient temperature, e.g., at a temperature of about 15° C. to about 30° C., and at a pressure sufficient to assemble the plys into a coherent article. The plys can be subjected to such pressure until a sufficient initial pre-pressed bond can be obtained to keep the plys from separating or coming apart upon release of the pressure. A pressure of about 172 kPa to about 2,758 kPa can be applied to the plys. A bond of the required strength can be obtained with a contact time of about 30 seconds to about 20 minutes.

After this initial consolidation, the pressure on the panels can be released and the panels can be stored until consolidated at an elevated temperature at which the resin composition cures. For the final press, the panels can be consolidated at a temperature of about 90° C. to about 300° C. and at pressures of about 517 kPa to about 1,724 kPa. The panels can be subjected to these press conditions for a time sufficient to cure the adhesive, which can be about 1 to about 20 minutes.

The resin compositions can be used for gluing high average moisture content veneers with reduced blowouts and other moisture induced defects. By using a resin composition, plywood can be prepared from a plurality of veneers having an average moisture content of greater than 7 wt % and up to about 12 wt % or greater, with spots of moisture of about 15 wt % to about 20 wt %, based on the dry weight of the veneer. For example, the veneer can have an average moisture content from a low of about 3 wt %, about 5 wt %, about 7 wt %, about 9 wt %, about 11 wt %, or about 13 wt % to a high of about 17 wt %, about 20 wt %, about 22 wt %, or about 25 wt %, based on the dry weight of the veneer. In another example, the veneer can have an average moisture content of about 3 wt % to about 5 wt %, about 5 wt % to about 7 wt %, about 7 wt % to about 9 wt %, or about 9 wt % to about 13 wt %, based on the dry weight of the veneer. The veneers can have localized regions or spots of high moisture content. For example, the veneer can have localized regions with a moisture content of about 40 wt %, about 45 wt %, or about 50 wt %.

The composite lignocellulose containing products produced with the resin compositions discussed and described herein can exhibit a low level of formaldehyde emission. A suitable test for determining formaldehyde emission from a composite wood product that includes an at least partially cured resin of the resin composition can include ASTM D6007 and ASTM E1333. For example, the composite lignocellulose containing products containing an at least partially cured resin of the resin composition can exhibit a formaldehyde emission of zero. In another example, the composite lignocellulose containing products containing an at least partially cured resin of the resin composition can exhibit a formaldehyde emission of less than 1 part per million ("ppm"), less than 0.9 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, or less than 0.005 ppm.

The urea mixture can be used as a selective non-catalytic reduction reagent for reducing oxidized nitrogen species for engines, burners, furnaces, boilers, and the like. The oxidized nitrogen species can include $NO_2$, $N_2O$, and NO, and are referred to herein as "$NO_X$." While not wanting to bound to any particular theory or reaction mechanism, the overall chemical reaction for urea ($NH_2CONH_2$) reducing nitric oxide NO, for example, can be depicted by Equation 1.

$$NH_2CONH_2+2NO+\tfrac{1}{2}O_2 \rightarrow 2N_2+CO_2+2H_2O \quad \text{(Eq. 1)}$$

The resulting products of this redox reaction are the more environmentally-friendly chemical species of nitrogen ($N_2$), carbon dioxide ($CO_2$), and water ($H_2O$).

The engines, burners, furnaces, and boilers can include mobile sources such as internal combustion engines in vehicles and stationary sources such as power plants, process furnaces, and incinerators. Engines can include all machines which combust fuel to provide heat, e.g., for direct or indirect conversion to mechanical or electrical energy. Internal combustion engines of the Otto, diesel and turbine types, as well as burners and furnaces, are included. Diesel engines can include all compression-ignition engines including two-stroke per cycle, four-stroke per cycle and rotary types. The combustion effluent can include gases that flow out from a region of combustion in such combustion sources.

The fuel can be hydrocarbon fuel including those prepared from distillate fuels or petroleum, such as gasoline, jet fuel, diesel fuel, kerosene, naphtha, and paraffin. Petroleum can include those materials regardless of source and viscosity that are recovered from fossil fuels. Distillate fuel can include those products prepared by the distillation of petroleum or petroleum fractions and residues. The diesel fuels can include, but are not limited to, those that contain alcohols and esters, have a sulfur content of up to about 0.05% by weight or are sulfur-free, chlorine-free or low-chlorine diesel fuel and the like. The fuel can include those derived from non-petroleum sources such as vegetable sources, e.g., corn, alfalfa, and mineral sources, e.g., shale and coal. The fuel can also include alcohols such as methanol, ethanol and the like, ethers such as diethyl ether, methyl ethyl ether and the like, organonitro compounds and the like. The fuel can be in the gas phase or liquid phase. The fuel can also include mixtures of petroleum and non-petroleum fuels.

The urea mixture can include a liquid medium, such as water or an organic solvent or a combination thereof. A proper balance of liquid medium or water is necessary to achieve because it requires additional energy and time to vaporize but which can maintain a low, effective temperature for the reduction of $NO_X$. The liquid medium or water can be employed in concentrations from a low of about 5 wt %, about 10 wt %, about 20 wt %, or about 30 wt % to a high of about 50 wt %, about 60 wt %, about 80 wt %, or about 90 wt %, based on the combined weight of the urea, the urea-aldehyde resin, the liquid medium, and the sugar. In another example, the liquid medium can be in concentration of about 6 wt % to about 12 wt %, about 23 wt % to about 42 wt %, about 34 wt % to about 64 wt %, about 60 wt % to about 74 wt %, about 68 wt % to about 82 wt %, or about 85 wt % to about 90 wt %, based on the combined weight of the urea, the urea-aldehyde resin, the liquid medium, and the sugar.

The urea mixture can include an oxygen-containing material to provide an oxygen source for the reaction depicted Eq. 1. Such oxygen-containing material can include alcohols having from 1 to about 8 carbon atoms, e.g., methanol, can be employed. The aldehyde in the urea-aldehyde resin can also act as the oxygen-containing material. The oxygen-containing material can be in a concentration from a low of about 5 wt %, about 10 wt %, about 20 wt %, or about 30 wt % to a high of about 50 wt %, about 60 wt %, about 80 wt %, or about 90 wt %, based on the combined weight of the urea mixture, the liquid medium, and the oxygen-containing material. In another example, the oxygen-containing material can be in a concentration of about 6 wt % to about 12 wt %, about 23 wt % to about 42 wt %, about 34 wt % to about 64 wt %, about 60 wt % to about 74 wt %, about 68 wt % to about 82 wt %, or about 85 wt % to about 90 wt %, based on the combined weight of the urea mixture, the liquid medium, and the oxygen-containing material.

The fuels can include additives such as dyes, cetane improvers, antioxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, anti-icing agents and the like. The additives can be in a concentration from a low of about 5 wt %, about 10 wt %, about 20 wt %, or about 30 wt % to a high of about 50 wt %, about 60 wt %, about 80 wt %, or about 90 wt %, based on the combined weight of the urea, the urea-aldehyde resin, the liquid medium, the sugar, and the additive. In another example, the additives can be in a concentration of about 6 wt % to about 12 wt %, about 23 wt % to about 42 wt %, about 34 wt % to about 64 wt %, about 60 wt % to about 74 wt %, about 68 wt % to about 82 wt %, or about 85 wt % to about 90 wt %, based on the combined weight of the urea, the urea-aldehyde resin, the liquid medium, the sugar, and the additive.

The urea mixture can be injected into the combustion effluent so as to provide substantially uniform distribution of the urea in the effluent stream. For example, the urea mixture can be injected into the superheater region of a boiler, or in an exhaust manifold or combustion chamber of a diesel engine. The injection of the urea mixture into the combustion effluent can be in a single charge or may be incrementally added. The mixing of the urea mixture and the combustion effluent can be important. $NO_X$ tends to form more in the center of the effluent conduit and less near the walls due the cooler temperatures found there. Thus, it can be effective to provide the urea mixture more towards the center, otherwise the $NO_X$ in the center meets insufficient urea for reduction. The urea mixture can be injected as a fine spray, e.g., an atomized mist.

The urea mixture can be injected at a number of spaced points where there is sufficient turbulence to distribute the droplets throughout the effluent. The urea mixture can be injected from nozzles that can uniformly form and disperse droplets of mixture within the combustion effluent. The nozzles can be located at a sufficient number of points to achieve uniform mixing. The size of the droplets of the urea mixture can be about 10 to about 10,000 microns. The droplet size can be important to enable uniform mixing of the urea with the combustion effluent and penetration of the urea into the effluent conduit. The size of the droplets can increase with increasing temperature. For example, at injection temperatures of less than 95° C., the droplet size can be less than 150 microns, while at greater temperatures, the droplets can be greater than 500 microns.

Suitable injection techniques can include piping the urea mixture with an oxygen-containing material and a carrier gas through separate lines into one common vessel and allowing the reactants and the carrier gas to mix as they flow towards the injection point. Mixing can increase the local contact of the reactants with the $NO_X$ in the combustion effluent at the desired molar ratios. Any suitable mixing techniques can be employed to achieve this end. These techniques can include, but are not limited to, injecting a premixed stream of a urea mixture and the carrier gas into the combustion effluent or injecting the urea mixture and carrier gas into the combustion effluent separately.

Urea mixture can be fed into the combustion effluent, in response to a feed-forward controller in response to a number of measured parameters, including: engine load as represented by various mechanical or electronic measures such as fuel flow, tack or pulse width, engine speed, intake air temperature; barometric pressure; intake air humidity; exhaust gas temperature and/or other parameters effective for particular engines. The urea mixture can be introduced into the combustion effluent in an amount sufficient to provide the degree of $NO_X$ reduction desired. The desired amount can be dictated by regulation, engine design requirements or other criteria. For example, a molar ratio of the active species to the baseline nitrogen oxides level (by which is meant the pretreatment level of $NO_X$ in the effluent) can be employed. The urea mixture can be supplied to provide a molar ratio of urea to baseline nitrogen oxides of about 0.5:1 to about 1:1. An effective amount of urea mixture can be based on the amount of $NO_X$ that is to be reduced. The urea levels or target $NO_X$ concentrations in the combustion effluent can be preprogrammed into a controller based on tested values for given fuel flows and related parameters, or sensors and related controls can be provided to provide real-time readouts. A sensor can be provided to correct preprogrammed values by feedback control.

The amount of urea mixture used can be from a low of about 0.5, about 1, about 2 to a high of about 8, about 9, or about 10 moles of urea per mole of $NO_X$. In another example, the amount urea from the urea mixture can be about 0.7 to about 0.9, about 1.1 to about 1.4, about 1.5 to about 2.2, about 2.5 to about 4.5, about 3.2 to about 6.8, or about 3 to about 8 moles of urea per mole of $NO_X$.

The urea mixture can be contacted with the combustion effluent at a point where the effluent is at a temperature from a low of about 600° C., about 700° C., about 800° C., or about 900° C. to a high of about 1,000° C., about 1,200° C., about 1,400° C., about 1,600° C., or about 2,000° C. In another example, the combustion effluent can be at a temperature of about to about 650° C. to about 750° C., about 850° C. to about 950° C., about 1,050° C. to about 1,250° C., about 1,350° C. to about 1,550° C., about 1,650° C. to about 1,950° C. In the lower region of the temperature range, an auxiliary reductant, e.g. an alcohol can be present for reducing materials which are oxidizable at lower temperatures. At lower temperatures the NO and the urea can fail to react to a sufficient degree.

The reaction can be carried out at a pressure from a low of about 0.1 MPa, about 0.05 MPa, about 0.5 MPa, about 1.5 MPa to a high of about 10 MPa, to about 20 MPa, or about 50 MPa. In another example, reaction can be carried out at a pressure of about 0.05 MPa to about 1 MPa about 1.5 MPa to about 10 MPa, about 30 MPa to about 40 MPa about 35 MPa to about 40 MPa, or about 38 MPa to about 48 MPa.

The velocities of the combustion effluents as well as the mixing of the urea mixture in the post-combustion zone are regulated so that there is a sufficient residence time to enable the ammonia to remove the $NO_X$ from the combustion effluents. The residence time for the reaction between the urea mixture and $NO_X$ can be from a low of about 0.001 seconds, about 0.01 seconds, about 0.1 seconds, or about 1 second, to a high of about 5 seconds or about 10 seconds. In another example, the residence time can be about 0.003 seconds to about 0.03 seconds, about 0.005 seconds to about 0.3 seconds, about 0.8 seconds to about 0.03 seconds, or about 0.003 seconds to about 8 seconds.

The selective non-catalytic reduction using urea mixture can be used either alone or in conjunction with other selective catalytic reduction methods.

EXAMPLES

In order to provide a better understanding of the foregoing discussion, the following non-limiting examples are offered. Although the examples can be directed to specific embodiments, they are not to be viewed as limiting the invention in any specific respect.

Urea Mixtures for Use as Formaldehyde Scavenger

For comparative example C1 and inventive example Ex. 1, Southern Yellow Pine wood furnish (7,997 g, moisture content 5.4 wt %) was added to a ribbon blender. For the comparative example C1, 607 g of a urea-formaldehyde resin and 383 g of formaldehyde scavenger that contained 5.14 wt % salt was combined the wood furnish to produce a resinated furnish. For the inventive example Ex. 1, 607 g of a urea-formaldehyde resin and 383 g of formaldehyde scavenger that contained 5.14 wt % sugar was combined the wood furnish to produce a resinated furnish. The only difference between C1 and Ex. 1 was the salt and sugar respectively. The molar ratio of formaldehyde to urea (F:U) after the addition of the formaldehyde scavenger was 0.85 for both the comparative example C1 and the inventive example Ex. 1. After the urea-formaldehyde resin and scavenger were blended with the wood furnish, the moisture content of the wood furnish was measured at 9 wt % for both examples.

The wood furnish (938 g) was placed into 12 inch by 12 inch mat forming frame and manually pre-pressed. The frame was removed to provide a pre-pressed or consolidated mat. The consolidated mat was placed into a hot press at a temperature of about 165° C. (330° F.) and subjected to pressure for about varying time from 120 to 240 seconds. A three-step pressing program was used for the particleboard production. In a first step, the pressure was increased to 600 psi over 60 seconds to a final panel thickness of about 0.5 in. In a second step, the thickness was held constant at 0.5 in. while the pressure was allowed to decrease for the remainder of the pressing cycle (60 seconds, 90 seconds, or 120 seconds). In a third step, a 30 second decompression time at a set thickness of about 0.5 in. was used at the end of the process.

The particleboard was then cut into 10 blocks measuring 2 inches by 2 inches with a varying degree of thickness depending on the degree each was compacted in the press. The weights were measured to determine the average density. The formaldehyde emissions for the samples were measured. The formaldehyde emissions that used C1 were 0.65 ppm and those of the inventive Ex. 1 were 0.58 ppm. The IB was then tested according to ASTM D1037-06a and the results are shown in the Table below.

|  | Additive | Press Time (seconds) | IB-Mean (psi) | IB Std. Err. | IB 95.00% | IB +95.00% | N |
|---|---|---|---|---|---|---|---|
| C1 | Salt | 150 | 61.55 | 4.079 | 53.46 | 69.64 | 10 |
| C1 | Salt | 180 | 78.42 | 4.079 | 70.34 | 86.51 | 10 |
| C1 | Salt | 210 | 74.89 | 4.079 | 66.8 | 82.98 | 10 |
| Ex. 1 | Sugar | 150 | 65.52 | 4.079 | 57.43 | 73.6 | 10 |
| Ex. 1 | Sugar | 180 | 66.09 | 4.079 | 58.01 | 74.18 | 10 |
| Ex. 1 | Sugar | 210 | 79.12 | 4.079 | 71.03 | 87.21 | 10 |

Embodiments of the present disclosure further relate to any one or more of the following paragraphs:

1. A urea mixture, comprising: urea, a urea-aldehyde resin, a liquid medium, and a sugar, wherein the urea mixture has an aldehyde to urea molar ratio of about 0.2:1 to about 0.7:1, and wherein the urea mixture has a sugar concentration of about 2 wt % to about 8 wt %, based on the combined weight of the urea, the urea-aldehyde resin, the liquid medium, and the sugar.

2. The urea mixture according to paragraph 1, wherein the aldehyde to urea molar ratio is about 0.2:1 to about 0.4:1.

3. The urea mixture according to paragraph 1 or 2, wherein the urea mixture has a urea concentration of about 30 wt % to about 65 wt %, based on the combined weight of the urea, the urea-aldehyde resin, the liquid medium, and the sugar.

4. The urea mixture according to any one of paragraphs 1 to 3, wherein the urea mixture has a urea concentration of about 45 wt % to about 60 wt %, based on the combined weight of the urea, the urea-aldehyde resin, the liquid medium, and the sugar.

5. The urea mixture according to any one of paragraphs 1 to 4, wherein the urea mixture has a liquid medium concentration of about 10 wt % to about 60 wt %, based on the combined weight of the urea, the urea-aldehyde resin, the liquid medium, and the sugar.

6. The urea mixture according to any one of paragraphs 1 to 5, wherein the liquid medium is water.

7. The urea mixture according to any one of paragraphs 1 to 6, wherein the urea mixture has a sugar concentration of about 5 wt % to about 7 wt %, based on the combined weight of the urea, the urea-aldehyde resin, the liquid medium, and the sugar.

8. The urea mixture according to any one of paragraphs 1 to 7, wherein the urea mixture has a non-volatile solids content of about 40 wt % to about 70 wt %, based on the combined weight of the urea, the urea-aldehyde resin, the liquid medium, and the sugar.

9. The urea mixture according to any one of paragraphs 1 to 8, wherein the urea mixture does not contain melamine.

10. The urea mixture according to any one of paragraphs 1 to 9, wherein the urea mixture is substantially free from melamine.

11. The urea mixture according to any one of paragraphs 1 to 10, wherein the sugar is a monosaccharide.

12. The urea mixture according to any one of paragraphs 1 to 11, wherein the sugar comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose; fructose, psicose, dendroketose, aldotetrose, aldopentose, aldohexose, sorbose, tagatose, gentiobiose, sedoheptulose, or any combination thereof.

13. The urea mixture according to any one of paragraphs 1 to 12, wherein the sugar is a disaccharide.

14. The urea mixture according to any one of paragraphs 1 to 13, wherein the sugar comprises sucrose, lactose, maltose, or any combination thereof.

15. The urea mixture according to any one of paragraphs 1 to 14, wherein the sugar is high fructose corn syrup.

16. The urea mixture according to any one of paragraphs 1 to 15, wherein the sugar is reacted with the urea-aldehyde resin to form a chemical bond.

17. The urea mixture according to any one of paragraphs 1 to 16, wherein the sugar remains a discrete component in the urea mixture.

18. The urea mixture according to any one of paragraphs 1 to 17, wherein the urea mixture has a viscosity of about 100 cP to about 1,000 cP at a temperature of about 25° C.

19. A method for making a urea mixture, comprising: reacting an aldehyde and urea at a molar ratio of about 1.6:1 to about 2.4:1 in the presence of a liquid medium to produce a urea-aldehyde resin; adding urea to the urea-aldehyde resin to provide an intermediate mixture having an aldehyde to urea molar ratio of about 0.2:1 to about 0.7:1; and adding a sugar to the intermediate mixture to produce a urea mixture comprising about 2 wt % to about 8 wt % sugar, based on the combined weight of the urea, the urea-aldehyde resin, the liquid medium, and the sugar.

20. The method according to paragraph 19, wherein the intermediate mixture has a urea molar ratio of about 0.2:1 to about 0.4:1.

21. The method according to paragraph 19 or 20, wherein the urea mixture has a urea concentration of about 30 wt % to about 65 wt %, based on the combined weight of the urea, the urea-aldehyde resin, the liquid medium, and the sugar.

22. The method according to any one of paragraphs 19 to 21, wherein the urea mixture has a urea concentration of about 45 wt % to about 60 wt %, based on the combined weight of the urea, the urea-aldehyde resin, the liquid medium, and the sugar.

23. The method according to any one of paragraphs 19 to 22, wherein the urea mixture has a liquid medium concentration of about 10 wt % to about 60 wt %, based on the combined weight of the urea, the urea-aldehyde resin, the liquid medium, and the sugar.

24. The method according to any one of paragraphs 19 to 23, wherein the liquid medium is water.

25. The method according to any one of paragraphs 19 to 24, wherein the urea mixture has a sugar concentration of about 5 wt % to about 7 wt %, based on the combined weight of the urea, the urea-aldehyde resin, the liquid medium, and the sugar.

26. The method according to any one of paragraphs 19 to 25, wherein the urea mixture has a non-volatile solids content of about 40 wt % to about 70 wt %, based on the combined weight of the urea, the urea-aldehyde resin, the liquid medium, and the sugar.

27. The method according to any one of paragraphs 19 to 26, wherein the urea mixture does not contain melamine.

28. The method according to any one of paragraphs 19 to 27, wherein the urea mixture is substantially free from melamine.

29. The method according to any one of paragraphs 19 to 28, wherein the sugar is a monosaccharide.

30. The method according to any one of paragraphs 19 to 29, wherein the sugar comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose; fructose, psicose, dendroketose, aldotetrose, aldopentose, aldohexose, sorbose, tagatose, gentiobiose, sedoheptulose, or any combination thereof.

31. The method of according to any one of paragraphs 19 to 30, wherein the sugar is a disaccharide.

32. The method according to any one of paragraphs 19 to 31, wherein the sugar comprises sucrose, lactose, maltose, or any combination thereof.

33. The method according to any one of paragraphs 19 to 32, wherein the sugar is high fructose corn syrup.

34. The method according to any one of paragraphs 19 to 33, wherein the sugar is reacted with urea-aldehyde resin to form a chemical bond.

35. The method according to any one of paragraphs 19 to 34, wherein the sugar remains a discrete component in the urea mixture.

36. The method according to any one of paragraphs 19 to 35, wherein the urea mixture has a viscosity of about 100 cP to about 1,000 cP at a temperature of about 25° C.

37. A method for making a composite product, comprising: contacting a plurality of lignocellulosic substrates with a urea mixture comprising: urea, a urea-aldehyde resin, a liquid medium, and a sugar, wherein the urea mixture has an aldehyde to urea molar ratio of about 0.2:1 to about 0.7:1, and wherein the urea mixture has a sugar concentration of about 2 wt % to about 8 wt %, based on the combined weight of the urea, the urea-aldehyde resin, the liquid medium, and the sugar; and at least partially curing the urea mixture to produce a composite product.

38. The method according to paragraph 37, wherein the aldehyde to urea molar ratio is about 0.2:1 to about 0.4:1.

39. The method according to paragraph 37 or 38, wherein the urea mixture has a urea concentration of about 30 wt % to about 65 wt %, based on the combined weight of the urea, the urea-aldehyde resin, the liquid medium, and the sugar.

40. The method according to any one of paragraphs 37 to 39, wherein the urea mixture has a urea concentration of about 45 wt % to about 60 wt %, based on the combined weight of the urea, the urea-aldehyde resin, the liquid medium, and the sugar.

41. The method according to any one of paragraphs 37 to 40, wherein the urea mixture has a liquid medium concentration of about 10 wt % to about 60 wt %, based on the combined weight of the urea, the urea-aldehyde resin, the liquid medium, and the sugar.

42. The method according to any one of paragraphs 37 to 41, wherein the liquid medium is water.

43. The method according to any one of paragraphs 37 to 42, wherein the urea mixture has a sugar concentration of about 5 wt % to about 7 wt %, based on the combined weight of the urea, the urea-aldehyde resin, the liquid medium, and the sugar.

44. The method according to any one of paragraphs 37 to 43, wherein the urea mixture has a non-volatile solids content of about 40 wt % to about 70 wt %, based on the combined weight of the urea, the urea-aldehyde resin, the liquid medium, and the sugar.

45. The method according to any one of paragraphs 37 to 44, wherein the urea mixture does not contain melamine.

46. The method according to any one of paragraphs 37 to 45, wherein the urea mixture is substantially free from melamine.

47. The method according to any one of paragraphs 37 to 46, wherein the sugar is a monosaccharide.

48. The method according to any one of paragraphs 37 to 47, wherein the sugar comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose; fructose, psicose, dendroketose, aldotetrose, aldopentose, aldohexose, sorbose, tagatose, gentiobiose, sedoheptulose, or any combination thereof.

49. The method according to any one of paragraphs 37 to 48, wherein the sugar is a disaccharide.

50. The method according to any one of paragraphs 37 to 49, wherein the sugar comprises sucrose, lactose, maltose, or any combination thereof.

51. The method according to any one of paragraphs 37 to 50, wherein the sugar is high fructose corn syrup.

52. The method according to any one of paragraphs 37 to 51, wherein the sugar is reacted with urea-aldehyde resin to form a chemical bond.

53. The method according to any one of paragraphs 37 to 52, wherein the sugar remains a discrete component in the urea mixture.

54. The method according to any one of paragraphs 37 to 53, wherein the urea mixture has a viscosity of about 100 cP to about 1,000 cP at a temperature of about 25° C.

55. The method according to any one of paragraphs 37 to 54, wherein the composite product has an internal bond strength of about 0.32 MPa to about 0.69 MPa.

56. A method for reducing emissions of $NO_X$ comprising: contacting a combustion effluent with a urea mixture comprising a urea mixture comprising urea, a urea-aldehyde resin, a liquid medium, and a sugar, wherein the urea mixture has an aldehyde to urea molar ratio of about 0.2:1 to about 0.7:1, and wherein the urea mixture has a sugar concentration of about 2 wt % to about 8 wt %, based on the combined weight of the urea, the urea-aldehyde resin, the liquid medium, and the sugar.

57. The method according to paragraph 56, wherein the aldehyde to urea molar ratio is about 0.2:1 to about 0.4:1.

58. The method according to paragraph 56 or 57, wherein the urea mixture has a urea concentration of about 30 wt % to about 65 wt %, based on the combined weight of the urea, the urea-aldehyde resin, the liquid medium, and the sugar.

59. The method according to any one of paragraphs 56 to 58, wherein the urea mixture has a urea concentration of about 45 wt % to about 60 wt %, based on the combined weight of the urea, the urea-aldehyde resin, the liquid medium, and the sugar.

60. The method according to any one of paragraphs 56 to 59, wherein the urea mixture has a liquid medium concentration of about 10 wt % to about 60 wt %, based on the combined weight of the urea, the urea-aldehyde resin, the liquid medium, and the sugar.

61. The method according to any one of paragraphs 56 to 60, wherein the liquid medium is water.

62. The method according to any one of paragraphs 56 to 61, wherein the urea mixture has a sugar concentration of about 5 wt % to about 7 wt %, based on the combined weight of the urea, the urea-aldehyde resin, the liquid medium, and the sugar.

63. The method according to any one of paragraphs 56 to 62, wherein the urea mixture has a non-volatile solids content of about 40 wt % to about 70 wt %, based on the combined weight of the urea, the urea-aldehyde resin, the liquid medium, and the sugar.

64. The method according to any one of paragraphs 56 to 63, wherein the urea mixture does not contain melamine.

65. The method according to any one of paragraphs 56 to 64, wherein the urea mixture is substantially free from melamine.

66. The method according to any one of paragraphs 56 to 65, wherein the sugar is a monosaccharide.

67. The method of according to any one of paragraphs 56 to 66, wherein the sugar comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose; fructose, psicose, dendroketose, aldotetrose, aldopentose, aldohexose, sorbose, tagatose, gentiobiose, sedoheptulose, or any combination thereof.

68. The method according to any one of paragraphs 56 to 67, wherein the sugar is a disaccharide.

69. The method according to any one of paragraphs 56 to 68, wherein the sugar comprises sucrose, lactose, maltose, or any combination thereof.

70. The method according to any one of paragraphs 56 to 69, wherein the sugar is high fructose corn syrup.

71. The method according to any one of paragraphs 56 to 70, wherein the sugar is reacted with urea-aldehyde resin to form a chemical bond.

72. The method according to any one of paragraphs 56 to 71, wherein the sugar remains a discrete component in the urea mixture.

73. A composite product, comprising: a plurality of lignocellulose substrates and an at least partially cured resin composition, wherein prior to curing the resin composition comprises: a urea mixture, comprising urea, a urea-aldehyde resin, a liquid medium, and a sugar, wherein the urea mixture has an aldehyde to urea molar ratio of about 0.2:1 to about 0.7:1, and wherein the urea mixture has a sugar concentration of about 2 wt % to about 8 wt %, based on the combined weight of the urea, the urea-aldehyde resin, the liquid medium, and the sugar, and an aldehyde-based resin.

74. The composite product according to paragraph 73, wherein the aldehyde-based resin comprises a urea-formaldehyde resin, a phenol-formaldehyde resin, a melamine-formaldehyde resins, a melamine-urea-formaldehyde resin, a melamine-urea-phenol-formaldehyde resin, or any mixture thereof.

75. The composite product according to paragraph 73 or 74, wherein the composite product has an internal bond strength of about 0.32 MPa to about 0.69 MPa.

76. The composite product according to any one of paragraphs 73 to 75, wherein the aldehyde to urea molar ratio is about 0.2:1 to about 0.4:1.

77. The composite product according to any one of paragraphs 73 to 76, wherein the urea-aldehyde resin comprises a urea-formaldehyde resin.

78. The composite product according to any one of paragraphs 73 to 77, wherein the urea mixture has a urea concentration of about 35 wt % to about 65 wt %, based on the combined weight of the urea, the urea-aldehyde resin, the liquid medium, and the sugar.

79. The composite product according to any one of paragraphs 73 to 78, wherein the urea mixture has a sugar concentration of about 4 wt % to about 7 wt %, based on the combined weight of the urea, the urea-aldehyde resin, the liquid medium, and the sugar.

80. The composite product according to any one of paragraphs 73 to 79, wherein the sugar comprises a disaccharide.

81. The composite product according to any one of paragraphs 73 to 80, wherein the sugar comprises sucrose.

82. The composite product according to any one of paragraphs 73 to 81, wherein the urea mixture has a non-volatile solids content of at least 60 wt %, based on the combined weight of the urea, the urea-aldehyde resin, the liquid medium, and the sugar.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A urea mixture, comprising:
   urea, a urea-aldehyde resin, a liquid medium, and a sugar, wherein the urea mixture has an aldehyde to a total urea molar ratio of about 0.2:1 to about 0.4:1, a freezing point of −12° C. to 20° C., and a sugar concentration of about 2 wt % to about 8 wt %, based on the combined weight of the urea, the urea-aldehyde resin, the liquid medium, and the sugar.

2. The urea mixture of claim 1, wherein the aldehyde to the total urea molar ratio is about 0.3:1 to about 0.4:1.

3. The urea mixture of claim 1, wherein the urea mixture has a urea concentration of about 30 wt % to about 65 wt %, based on the combined weight of the urea, the urea-aldehyde resin, the liquid medium, and the sugar.

4. The urea mixture of claim 1, wherein the urea mixture has a sugar concentration of about 5 wt % to about 7 wt %, based on the combined weight of the urea, the urea-aldehyde resin, the liquid medium, and the sugar.

5. The urea mixture of claim 1, wherein the urea mixture has a non-volatile solids content of about 40 wt % to about 70 wt %, based on the combined weight of the urea, the urea-aldehyde resin, the liquid medium, and the sugar.

6. The urea mixture of claim 1, wherein the urea mixture does not contain melamine.

7. The urea mixture of claim 1, wherein:
   the sugar comprises a disaccharide,
   the urea mixture comprises at least 40 wt % to about 70 wt % of the urea, based on the combined weight of the urea, the urea-aldehyde resin, the liquid medium, and the sugar, and
   the urea mixture has a non-volatile solids content of at least 60 wt % to about 70 wt %, based on the combined weight of the urea, the urea-aldehyde resin, the liquid medium, and the sugar.

8. The urea mixture of claim 1, wherein:
   the urea-aldehyde resin comprises a urea-formaldehyde resin,
   the urea-formaldehyde resin has a weight average molecular weight of about 700 to about 5,000, the urea mixture has a urea concentration of about 30 wt % to about 65 wt %, based on the combined weight of the urea, the urea-aldehyde resin, the liquid medium, and the sugar, the urea mixture has a sugar concentration of about 4 wt % to about 7 wt %, based on the combined weight of the urea, the urea-aldehyde resin, the liquid medium, and the sugar, the urea mixture has a non-volatile solids content of at least 40 wt % to about 70 wt %, based on the combined weight of the urea, the urea-aldehyde resin, the liquid medium, and the sugar, and the sugar comprises a disaccharide.

9. The urea mixture of claim 1, wherein:
the urea-aldehyde resin comprises a urea-formaldehyde resin, the urea-formaldehyde resin has a weight average molecular weight of about 700 to about 5,000, the urea mixture has a urea concentration of about 35 wt % to about 65 wt %, based on the combined weight of the urea, the urea-aldehyde resin, the liquid medium, and the sugar, the urea mixture has a sugar concentration of about 4 wt % to about 7 wt %, based on the combined weight of the urea, the urea-aldehyde resin, the liquid medium, and the sugar, the sugar comprises sucrose, the urea mixture has a viscosity of 700 cP to 2,200 cP at a temperature of about 25° C., and the urea mixture has a non-volatile solids content of at least 60 wt %, based on the combined weight of the urea, the urea-aldehyde resin, the liquid medium, and the sugar.

10. The urea mixture of claim 1, wherein the urea mixture has a viscosity of 700 cP to 2,200 cP at a temperature of about 25° C.

11. The urea mixture of claim 1, wherein:
the urea mixture has a non-volatile solids content of at least 50 wt % to about 80 wt %, based on the combined weight of the urea, the urea-aldehyde resin, the liquid medium, and the sugar, and the urea-aldehyde resin comprises a urea-formaldehyde resin.

12. The method of claim 1, wherein:
the urea mixture has a non-volatile solids content of at least 55 wt % to about 80 wt %, based on the combined weight of the urea, the urea-aldehyde resin, the liquid medium, and the sugar, the urea mixture comprises at least 40 wt % to about 70 wt % of the urea, based on the combined weight of the urea, the urea-aldehyde resin, the liquid medium, and the sugar, and the urea-aldehyde resin comprises a urea-formaldehyde resin.

13. A method for making a urea mixture, comprising:
reacting an aldehyde and urea at a molar ratio of about 1.6:1 to about 2.4:1 in the presence of a liquid medium to produce a urea-aldehyde resin;

adding urea to the urea-aldehyde resin to provide an intermediate mixture comprising urea, the urea-aldehyde resin, and the liquid medium; and adding a sugar to the intermediate mixture to produce a urea mixture comprising the urea, the urea-aldehyde resin, the liquid medium, and about 2 wt % to about 8 wt % of the sugar, based on the combined weight of the urea, the urea-aldehyde resin, the liquid medium, and the sugar, wherein the urea mixture has an aldehyde to a total urea molar ratio of about 0.2:1 to about 0.4:1, and a freezing point of −12° C. to 20° C.

14. The method of claim 13, wherein the aldehyde to the total urea molar ratio of the intermediate mixture is about 0.3:1 to about 0.4:1.

15. The method of claim 13, wherein the urea mixture has a urea concentration of about 30 wt % to about 65 wt %, based on the combined weight of the urea, the urea-aldehyde resin, the liquid medium, and the sugar.

16. The method of claim 13, wherein the urea mixture has a liquid medium concentration of about 10 wt % to about 60 wt %, based on the combined weight of the urea, the urea-aldehyde resin, the liquid medium, and the sugar.

17. The method of claim 13, wherein the urea mixture does not contain melamine.

18. The method of claim 13, wherein the sugar is a monosaccharide.

19. The method of claim 13, wherein:
the urea-formaldehyde resin is synthesized under acidic reaction conditions, and the urea mixture has a non-volatile solids content of at least 60 wt % to about 80 wt %, based on the combined weight of the urea, the urea-aldehyde resin, the liquid medium, and the sugar.

20. A method for making a composite product, comprising:
contacting a plurality of lignocellulosic substrates with a resin composition, wherein the resin composition comprises an aldehyde-based resin and a urea mixture, wherein the urea mixture comprises urea, a urea-aldehyde resin, a liquid medium, and a sugar, wherein the urea mixture has an aldehyde to a total urea molar ratio of about 0.2:1 to about 0.4:1 and a freezing point of −12° C. to 20° C., and wherein the urea mixture has a sugar concentration of about 2 wt % to about 8 wt %, based on the combined weight of the urea, the urea-aldehyde resin, the liquid medium, and the sugar; and at least partially curing the resin composition to produce a composite product.

* * * * *